INVENTORS.
Burnham W. King &
Walter A. Hedden

United States Patent Office 3,357,859
Patented Dec. 12, 1967

3,357,859
THERMALLY ACTIVATED ELECTRIC POWER SUPPLY
Burnham W. King, Columbus, and Walter A. Hedden, Worthington, Ohio, assignors, by mesne assignments, to Westinghouse Electric Corporation, East Pittsburgh, Pa., a corporation of Pennsylvania
Filed May 19, 1961, Ser. No. 111,389
4 Claims. (Cl. 136—6)

This invention relates to thermally activated electric power supplies and method and, more particularly, to galvanic-type cells which are actuated by thermal energy and a method for generating electric energy.

In copending application S.N. 111,388, now abandoned, filed concurrently herewith, titled, "Thermal Sensitive Electric Power Supply and Method," by Bascum O. Austin, and owned by the present assignee, is disclosed a simple, rugged and compact source which is actuated by thermal energy to generate electric energy. This source can act as a secondary battery. When the power source as disclosed in this copending application is operated in an inert atmosphere or vacuum, the reactions required to generate electric energy are substantially halted. Particularly for space craft and other similar applications, it is desirable to provide such a source which can operate in inert atmospheres or in vacuum. It is also desirable to increase the output potential and capacity for such power sources.

It is the general object of this invention to provide a simple, rugged and compact source which can operate under conditions of inert atmosphere or vacuum to generate electric energy.

It is another object to provide a simple, rugged and compact thermally activated secondary battery for providing electric energy, which battery has a somewhat improved voltage and power output.

It is a further object to provide a battery source of electric energy, which source can operate under conditions of inert atmosphere or vacuum.

It is an additional object to provide a method for generating electric energy.

The aforesaid objects of the invention, and other objects which will become apparent as the description proceeds, are achieved by providing a cell or source of electric energy wherein an electrolyte comprising a ceramic material has formed on one side thereof a first electrode which can react with the anionic portion of compound which is included in this ceramic material. This reaction liberates electrons to the first electrode and also forms a reaction compound which is assimilated into the ceramic material. Proximate to an opposite face of the ceramic material is positioned a reservoir of solid material which contains a substance which can react with mobile cations in the ceramic material to form additional reaction compound which can be assimilated into this ceramic material. A second electrode is positioned exterior to this reservoir of solid material. Mobile cations traverse the ceramic material and react with the substance contained in the reservoir layer and additional electrons available at the second electrode, in order to form a reaction compound which can be assimilated into the ceramic material. By virtue of the fact that all reacting compounds are solid in nature and are contained within the device per se, the device can operate in an inert atmosphere or in vacuum. There is also provided a method for generating electric energy from such a device.

For a better understanding of the invention, reference should be had to the accompanying drawings wherein.

Figure 1:
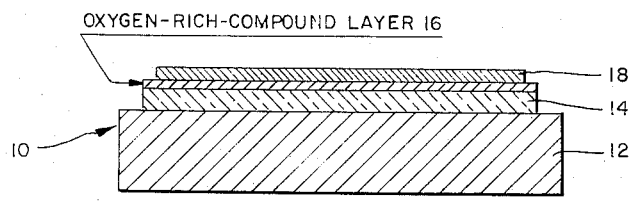
FIG. 1 is a sectional elevational view illustrating one form of cell fabricated in accordance with the present invention.

With specific reference to the form of the invention illustrated in the drawings, the device 10 as shown in FIG. 1 comprises a first electrode 12, a layer of vitreous enamel 14 thereover, a solid layer 16 comprising a reservoir of active material over the ceramic layer 14 and a second electrode 18 carried over the layer 16 of reservoir material.

Figure 2:
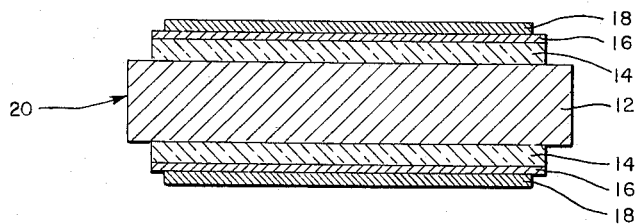
FIG. 2 is a sectional elevational view illustrating an alternative embodiment for the cell as shown in FIG. 1.

The cell embodiment 20, as shown in FIG. 2, generally corresponds to the embodiment 10, as shown in FIG. 1, except that the first electrode 12 carries vitreous ceramic layers 14 on either side thereof, with corresponding reservoir material layers 16 and corresponding second electrode layers 18 carried thereover. The cell embodiment 20 had advantages in that differences in coefficients of thermal expansion between the ceramic layers 14 and the first electrode 12 do not introduce excessive tendencies for warping during heating and cooling.

Figure 3:
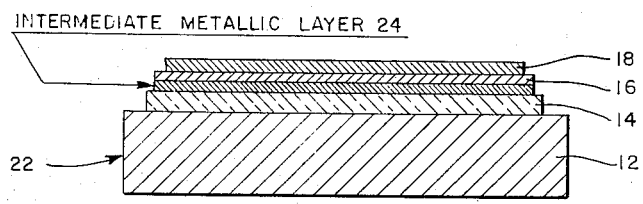
FIG. 3 is a sectional elevational view illustrating another alternative embodiment for the cell as shown in FIG. 1.

The cell embodiment 22, as shown in FIG. 3, generally corresponds to the embodiment 10, as shown in FIG. 1, except that an additional layer 24 of metallic material is positioned between the ceramic layer 14 and the reservoir layer 16, in order to prevent interaction between the layers 14 and 16 during cell fabrication.

Many other electrode arrangements and constructions are possible and, as an example, a grid-mesh type of electrode arrangement, such as shown in U.S. Patent No. 2,001,852, granted May 21, 1935 to Romer, can have ceramic and reservoir material layers positioned between the individual spaced electrodes. Also, the first plate-type electrode 12, as shown in FIGS. 1–3, can be replaced by a metallic mesh.

Figure 4:
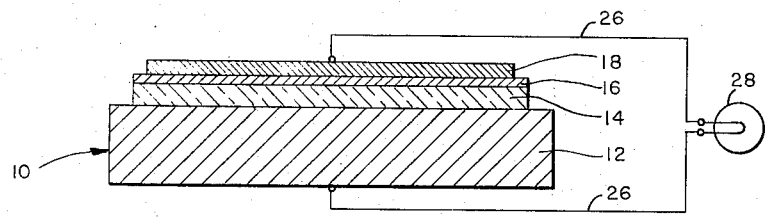
FIG. 4 illustrates an application for a cell generally as shown in FIG. 1, which cell serves as a source of electric energy to operate an electric light bulb.

In the schematic diagram as shown in FIG. 4, the separate electrodes 12 and 18 are connected by electrical conducting leads 26 to an external electric-power-consuming load, such as a light bulb 28. When the cell 10 is energized, the generated electric energy causes the light bulb 28 to incandesce.

As a specific example, the cell embodiment 20, as shown in FIG. 2, will be considered in detail. The first electrode 12 is formed of conventional enameling iron of No. 22 gauge thickness. This thickness is in no way critical. In preparing a suitable ceramic material for the layers 14, the following raw materials are manually dry mixed together in the quantities as tabulated below:

| Constituent: | Grams |
|---|---|
| Clinchfield feldspar | 375 |
| Anhydrous borax | 345 |
| Silica (as flint) | 300 |
| Soda ash | 90 |
| Soda nitre | 60 |
| Fluorospar | 165 |
| Barium carbonate | 120 |
| Cobalt oxide ($Co_2O_3$) | 12 |
| Nickel oxide (NiO) | 12 |
| Manganese oxide ($MnO_2$) | 21 |

Note: Lithium compound can be substituted for a part of the sodium compound in this example.

The mixed batch is smelted in a fire clay crucible in a gas-fired pot furnace at approximately 2200° F. for one hour. The molten glass is fritted by quenching in water and the resulting frit dried.

The calculated oxide composition of the foregoing frit, based on the raw mixed material, is as follows:

| Oxide: | Percent by weight |
| --- | --- |
| $SiO_2$ | 40.0 |
| $Al_2O_3$ | 4.6 |
| $Na_2O$ | 14.0 |
| $K_2O$ | 2.5 |
| $B_2O_3$ | 17.0 |
| $CaF_2$ | 11.9 |
| $BaO$ | 6.7 |
| $CoO$ | 0.9 |
| $NiO$ | 0.9 |
| $MnO_2$ | 1.5 |

The foregoing frit is incorporated into a liquid slip by milling the frit with suitable mill additions in a one-gallon ball mill for four hours. The slip constituents are as follows:

| Constituent: | Parts by weight, grams |
| --- | --- |
| Frit | 1000 |
| Tennessee No. 7 ball clay | 60 |
| Light magnesium carbonate | 1 |
| Water | 400 |

The slip is applied to both sides of a three inch by three inch square of conventional enameling iron, using a spray technique. The quantity applied is sufficient to provide a fired thickness of approximately 4 to 5 mils. The coated panels are first dried and then fired for 5 minutes to 1500° F.

After cooling, powdered silver orthophosphate is dusted onto the vitreous enamel layers 14 in amount of about 1.0 gram. This amount is not critical although inadequate amounts of this reservoir of oxygen will limit the battery capacity if it is to be operated in an inert atmosphere or a vacuum. The powdered silver orthophosphate and enamel layers 14 are then heated to about 700° C. for a period of 5 minutes partially to fuse the silver orthophosphate to the enamel layers 14 to form the solid layers 16 comprising silver orthophosphate reservoir material. After cooling, the electrodes 18 are formed onto the exposed surfaces of the orthophosphate layers 16 by applying silver paint onto two inch by two inch areas in the center portion of both layers 16. The painted area is dried and then fired for 5 minutes at 1000° F. to remove solvent and bake out binder material.

The fabrication of the cell embodiment 22, as shown in FIG. 3, is generally similar except that the layer 24 is formed of silver paint in a manner similar to the fabrication of the electrode layer 18, as described hereinbefore. Thereafter a layer of silver orthophosphate is dusted onto the intermediate metallic layer 24 and the device fired at a temperature of about 700° C. for a period of 5 minutes. The overlaying second electrode 18 is formed as described hereinbefore.

The general mechanism of operation for the present devices is explained in the aforementioned concurrently filed Austin application. Specifically considering the mechanism of operation for the present devices, mobile cations in the ceramic layer 14 are best provided by lighter alkali metals, with lithium or sodium preferred for greatest mobility. The lithium or sodium compounds in the ceramic are normally present in an ionized state, although these ionized compounds are electrically balanced. Particularly at elevated temperatures, the iron component of the first electrode 12 reacts with the anionic portion of the alkali salts, such as the oxide or the silicate for example. This forms an iron oxide or silicate, for example, which is assimilated into and is soluble in the ceramic layer 14 and electrons are released to the electrode 12. The electrically unbalanced alkali ions then traverse the ceramic layer 14 and react with oxygen which is available from the reservoir layer 16. In the reaction process, electrons available from the electrode 18 are also combined and the resulting formed alkali oxide is assimilated into the ceramic layer 14.

In testing the operation of the present devices, selected devices were operated in an air atmosphere and in an inert atmosphere, such as helium or nitrogen. The initial output of the devices in the air atmosphere was approximately 17 milliwatts per square inch of cell area. The initial output of the devices operated in the inert atmosphere was just slightly less than 16 milliwatts per square inch of cell area. If the present devices were modified to eliminate the separate layer 16 of reservoir material, and then operated in an inert atmosphere or vacuum, substantially no output would be obtained. It is thus apparent that the separate layer of silver orthophosphate serves as a reservoir for available oxygen which can react with the alkali ions in order to form alkali compound which is assimilated into the ceramic layer 14. This permits the battery reaction to proceed.

Devices constructed in accordance with the present invention will display a slightly higher initial potential than devices which do not utilize a separate layer of silver orthophosphate for example. In explanation, where a reaction substance such as oxygen passes through a gas-diffusion electrode, as in the cell embodiments described in the aforementioned copending Austin application, the potential available is just slightly less than 1 volt. When the separate reservoir layer 16 is used, however, apparently an alkali metal and silver-oxygen reaction is also involved and the open circuit potential varies from 1.15 to 1.2 volts. This also has the effect of increasing somewhat the battery capacity.

The present devices will normally operate best when heated to elevated temperatures, such as from 500° C. to 750° C., in order to increase the mobility of the released cations in the vitreous ceramic. As a matter of practicality, the best performance is obtained when the vitreous ceramic material and the bounding electrodes are heated to a sufficient temperature that the electrical resistance of the ceramic layer, taken in a direction perpendicular to the oppositely disposed electrodes, is less than 500,000 ohms per square inch of area. This resistance value is not limiting, however, and for applications where a relatively large power output is not required, the resistivity of the ceramic can be as high as several megohms per square inch. This has the effect of increasing the internal resistance of the battery. Even at normal ambient temperatures, however, some electric potential and energy can be obtained from the present batteries. The upper limit to the operating temperature is governed by the point at which the ceramic material will begin to deform and this will depend upon the formulation of the ceramic. As a practical matter, the operating temperature of the vitreous ceramic should be less than that temperature which is required to decrease its viscosity to less than $10^4$ poises.

The operation of the present batteries is quite similar to that of the usual battery and the power delivered decreases as the devices are operated, with the greater the electrical drain, the shorter the life. The present batteries have an excellent shelf life, however, even at elevated temperatures.

The foregoing battery reaction is essentially reversible and batteries constructed in accordance with the present invention can be charged and recharged, apparently with no loss of capacity. During discharge, however, the present batteries will tend to polarize. In explanation of the term "polarization," this term is generic to all effects which cause battery output voltage to decrease with time as the battery is discharged. In the present battery, it appears that polarization is due to a buildup or concentration of iron reaction compound in the ceramic layer.

The foregoing specific examples are subject to considerable modification. While the first electrode 12 is preferably formed of conventional enameling iron, this electrode can be formed of any material which can react with compound included in the ceramic layer 14 in order to replace a cationic portion of such compound and form reaction product which can be assimilated into or is soluble in the ceramic layer. In the case of the usual vitreous enamel, the electrode 12 can be formed of iron, aluminum, mangansese, titanium or copper, or any alloys thereof. Other metals can be used. The second electrode 18 can be formed of any suitable material which is electrically conducting, in order to provide electrons for the battery reaction. As an example, the electrode 18 can be formed of silver, gold, platinum or carbon as graphite, or any electrically conducting mixtures or alloys thereof. Other materials can be substituted for those listed.

For facility of manufacture, the ceramic layer 14 is preferably formed of vitreous material which can be applied as a frit. This vitreous ceramic material should contain what can be defined as a metallic oxide major ionic conductor which preferably comprises compounds of lithium, sodium or potassium, or mixtures thereof. For best initial output and overall performance, lithium is preferred, although in some cases better life has been obtained with a sodium compound. Other compounds can be substituted for these alkali compounds, provided that the cationic portions of such compounds are mobile in the vitreous ceramic material. The vitreous ceramic contains a large proportion of so-called glass-former materials such as silica or boric oxide or mixtures thereof. Apparently these glass formers essentially constitute a membrane of charged ions through which the smaller, mobile cations can migrate.

Many different enamel frits can be substituted for the foregoing specific example and following are listed six examples, designated A-F, of raw materials which will form suitable frits. Many other frits can be substituted for the following examples.

| Material | Parts by Weight | | | | | |
|---|---|---|---|---|---|---|
| | (A) | (B) | (C) | (D) | (F) | (F) |
| Feldspar | 25.0 | 25.0 | 25.0 | 16.7 | 8.3 | |
| Flint | 20.0 | 20.0 | 20.0 | 28.3 | 36.7 | 45.0 |
| Fluorospar | 7.3 | 3.7 | | | | |
| Boric acid | 28.3 | 28.3 | 28.3 | 28.3 | 28.3 | 28.3 |
| Lithium carbonate | 24.2 | 24.2 | 24.2 | 24.2 | 24.2 | 24.2 |
| Nickel oxide | 3.0 | 3.0 | 3.0 | 3.0 | 3.0 | 3.0 |
| Lithium fluoride | 1.2 | 2.4 | 3.6 | 3.6 | 3.6 | 3.6 |

*Mill batch composition for frit examples*

Constituent: Parts by weight
Frit _____ 1000
Tenn. No. 7 ball clay _____ 80
MgCO₃ _____ 1
Water _____ 400

The thickness of the ceramic or enamel layer is in no way critical. The lower limitation to the thickness is essentially governed by fabrication techniques. Of course the thinner the ceramic layer, the more rapidly this layer will become polarized with the iron compound which is formed from the battery reaction and this will decrease the effective capacity of the battery. An extremely thick ceramic layer will result in a somewhat increased internal resistance for the battery. As a practical matter, thicknesses of from 4 to 15 mils for the ceramic layer have been found to provide excellent results.

The intermediate layer of reservoir material 16 can be formed of a mixture of silver orthophosphate and ceramic frit similar to that used in forming the layer 14. As an example, equal parts by weight of silver orthophosphate and ceramic frit can be used. Other materials can be mixed with the silver orthophosphate, such as an equimolar mixture of silver orthophosphate and sodium orthophosphate.

Other oxygen-containing compounds can be used in forming the layer 16, such as BaO, sodium phosphate and $As_2O_3$. While oxides are preferred for use in the reservoir layer 16, other compounds can be used which will provide anionic material which can react with mobile cations in the ceramic layer in order to form additional reaction compound which can be assimilated into or dissolve in the ceramic layer 14. As an example, lithium fluoride is readily soluble in the usual vitreous ceramic material. Accordingly, fluorides such as silver difluoride, magnesium fluoride or alkaline earth fluorides can be used in forming the reservoir material layer 16.

In the embodiment 22, as shown in FIG. 3, the intermediate silver layer 24 can be replaced by other metallic materials which will permit the passage of the oxygen, for example, from the reservoir layer 16 to the ceramic layer 14. Examples of such other materials are gold, platinum or carbon as graphite.

As another alternative embodiment for the foregoing devices, the ceramic layer need not be vitreous in nature; that is, it need not have a melting point which occurs over a wide temperature range, although from the standpoint of facility of manufacture, this is desirable. It should be understood that any ceramic material can be utilized, whether vitreous or not, provided such material includes mobile cations.

The applications for the present devices are many and varied. When the device electrodes are connected to an external electric-power-consuming load, as in the application shown in FIG. 4, the device serves as a generator of electric energy. It may be desirable to have such a device serve as a temperature indicator in which case, the device can actuate a meter. As an example of such an application, the present devices can be used on the leading wing surfaces of space craft in order to measure temperatures. Other possible applications are fire alarm systems and in safety circuitry as well as in the thermal exploration of solid fuels. As another possible application, the present devices can be applied as "coatings" on nozzles of rockets, wherein waste heat is utilized for energization.

It will be recognized that the objects of the invention have been achieved by providing a simple, rugged and compact source which can operate under conditions of inert atmosphere and vacuum to generate electric energy. This source can function as a secondary battery which is operable at extremely high temperatures. There has also been provided a method for generating electric energy.

While best embodiments of the invention have been illustrated and described in detail, it is to be particularly understood that the invention is not limited thereto or thereby.

We claim:
1. A source of electric energy comprising, an iron electrode layer adapted to have electrons removed therefrom, a vitreous ceramic layer which includes lithium oxide over and adhered to said said iron electrode layer and comprising material having a negative temperature coefficient of electrical resistance due to ionic conductivity, a silver layer which is pervious to passage of oxygen over and adhered to said vitreous ceramic layer, an additional layer containing silver orthophosphate over and adhered to said silver layer, and a silver electrode layer over and adhered to said additional layer.

2. A source of electrical energy comprising: a first solid electrode layer adapted to have electrons removed therefrom and selected from at least one metal of the group consisting of iron, aluminum, manganese, titanium and copper; a vitreous ceramic layer adhered to said first electrode and comprising material having a negative temperature coefficient of electrical resistance due to ionic conductivity and including at least one oxide of the group consisting of lithium oxide, sodium oxide and potassium oxide; an additional layer contiguous to said ceramic layer and including a material of the group consisting of silver orthophosphate, barium oxide, sodium phosphate, arsenic oxide, silver difluoride, magnesium fluoride, calcium fluoride, barium fluoride and strontium fluoride; and a second solid electrode layer adhered to said additional layer and selected from at least one material of the group consisting of gold, silver, platinum and carbon.

3. The source as specified in claim 2, wherein said additional layer is selected from a material of the group consisting of silver orthophosphate, barium oxide, sodium phosphate and $As_2O_3$.

4. The source as specified in claim 2, wherein said additional layer is selected from a material of the group consisting of silver difluoride, magnesium fluoride, calcium fluoride, barium fluoride and strontium fluoride.

References Cited

UNITED STATES PATENTS

| | | | |
|---|---|---|---|
| 1,963,550 | 6/1934 | Greger | 136—86 |
| 2,631,180 | 3/1953 | Robinson | 136—153 |
| 2,901,524 | 8/1959 | Gorin et al. | 136—86 |
| 2,933,546 | 4/1960 | Weininger | 136—86 |
| 3,031,518 | 4/1962 | Werner et al. | 136—86 |
| 3,079,327 | 2/1963 | Lieb | 136—83 |

OTHER REFERENCES

Kiukkola et al.: "Journal of the Electrochemical Society," volume 104, pages 379–386, June 1957.

Rindone et al.: "Glasses as Electrolytes in Galvanic Cells: Silver Glasses," Jour. Am. Cer. Soc., vol. 33, 1950, pages 91–95.

WINSTON A. DOUGLAS, *Primary Examiner.*

JOHN H. MACK, MURRAY TILLMAN,
*Examiners.*

J. H. BARNEY, B. J. OHLENDORF, A. SKAPARS,
*Assistant Examiners.*